Dec. 15, 1936.  W. S. JENNENS  2,064,663
ELECTRICAL TESTING
Filed Jan. 3, 1936

Walter S. Jennens  Inventor
By Alpheus J. Crane  Attorney

Patented Dec. 15, 1936

2,064,663

UNITED STATES PATENT OFFICE 2,064,663

ELECTRICAL TESTING

Walter S. Jennens, Barberton, Ohio, assignor to The Ohio Brass Company, Mansfield, Ohio, a corporation of New Jersey Application January 3, 1936, Serial No. 57,342

13 Claims. (Cl. 175—183)

This invention relates to electrical testing and particularly to the determination of the time lag of flashover of electrical insulation, and has for one of its objects the provision of a simplified method and apparatus for determining the flashover time-lag curve of various forms of insulators.

A further object of the invention is to provide a method and apparatus for determining, by galvanometer readings, the crest voltage impressed upon a test piece and the time required for the piece to flashover under the measured voltage.

A further object of the invention is to provide a simplified method of operation and apparatus of improved construction and arrangement for determining the flashover time-lag curve of electrical apparatus.

Other objects and advantages will appear from the following description.

The invention is exemplified by the combination and arrangement of parts and by the steps of the process described in the following specification and illustrated by the accompanying drawing, and it is more particularly pointed out in the appended claims.

Figures 1, 2:
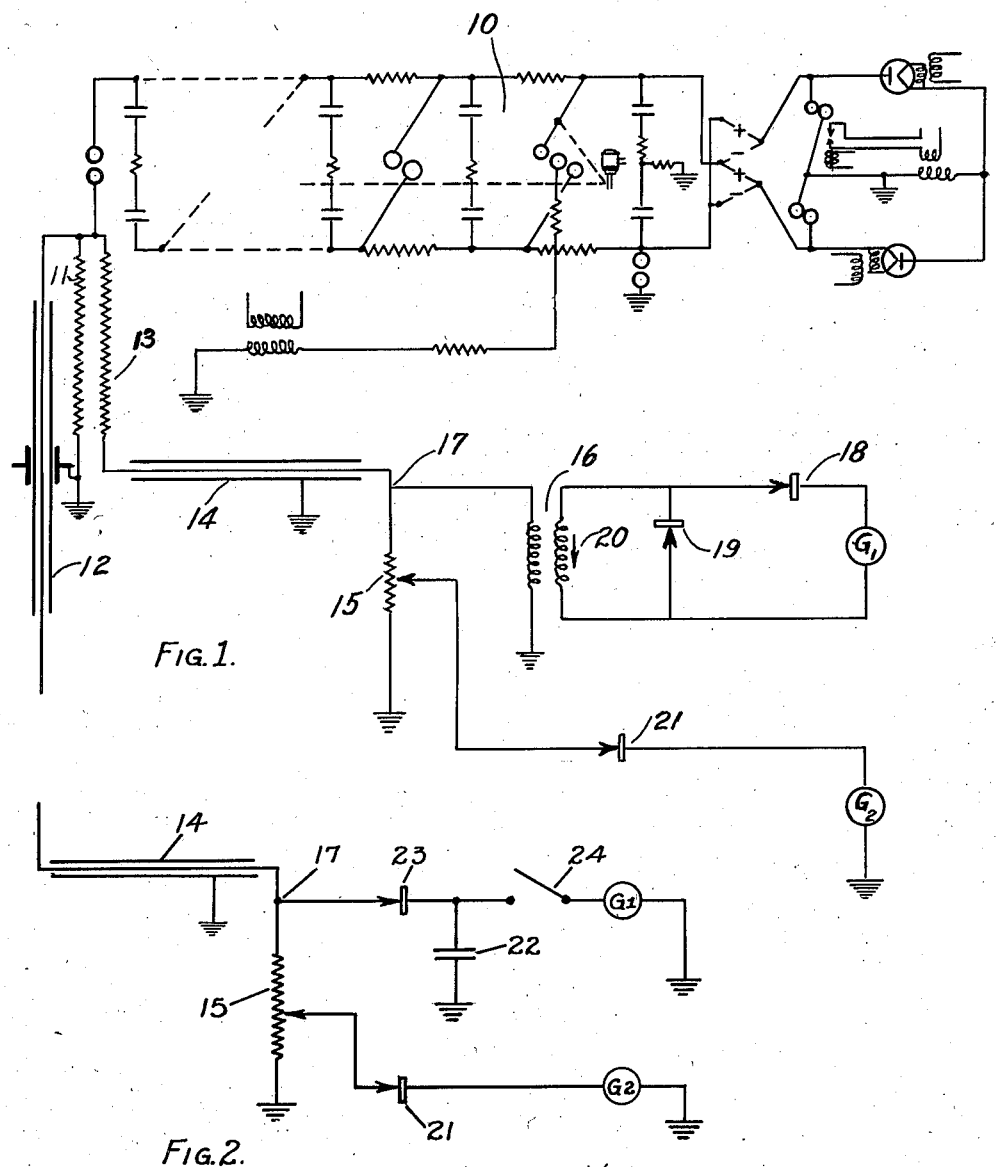
Fig. 1 is a circuit diagram showing one arrangement of apparatus for practicing the invention.
Fig. 2 is a fragmentary diagram of a modified form of the invention.

In operation of electrical apparatus, and particularly in connection with high potential insulators, it is desirable to have what is known as the flashover time-lag curve for particular pieces of apparatus, that is, a curve or other tabulation which shows the time that will elapse after various voltage impulses are impressed upon the apparatus before flashover will take place. Of course, in addition to the amount of the impressed voltage, this time will depend upon the characteristics of the apparatus itself and also upon the character of the impulse wave of the impressed voltage.

Time-lag curves for a particular piece of apparatus for one or more known wave forms usually give sufficient data on the particular piece of apparatus. In plotting these time lag curves, it has heretofore been the practice to impress upon the test piece a series of voltage impulses having known wave forms and having different crest values, and measuring by means of an oscillograph the time required before flashover occurs for the various impressed voltages. This operation is rather technical and requires considerable time for each impulse voltage since the readings of the oscillograph are taken photographically and plates must be developed and carefully checked by skilled operators to determine the desired readings.

The present invention avoids a great deal of this technical labor and obviates entirely the necessity of the use of photographic apparatus since the necessary readings are taken directly from indicating instruments.

In Fig. 1, the numeral 10 designates generally the circuit of an impulse generator by means of which test impulses of any desired wave form may be impressed upon a test piece 12 connected in parallel with a high resistance 11. Any suitable form of impulse generator may be used for this purpose, one form being shown and described in the patent to J. T. Lusignan, Jr., No. 1,997,064, granted April 9, 1935. Connected in parallel with the resistance 11 and the test piece 12 is a potentiometer or voltage divider comprising a resistance 13, a cable 14 and a secondary resistance 15. The cable 14 supplies capacitance for the potentiometer. This potentiometer arrangement is well known in the art and has heretofore been used for connecting test pieces with the oscillograph for recording the voltages and wave forms impressed upon test pieces.

It has heretofore been customary to connect the deflector plates of the oscillograph at spaced points on the potentiometer so as to include between the points of connection a portion of the resistance 15, thus impressing upon these plates a voltage proportional to the voltage supplied to the test piece. In the present invention, the oscillograph is dispensed with and in its place the apparatus shown in the lower part of Fig. 1 of the drawing is employed. A transformer 16 has one end of its primary winding connected at some point 17 to the potentiometer circuit; the other end of the primary winding being grounded.

A ballistic galvanometer $G_1$ is connected to the terminals of the secondary transformer, and an electric valve 18 is inserted in series with the galvanometer and a second electric valve 19 is placed in parallel with the galvanometer and valve 18. The connection of the transformer is such that during increase in the current in the primary winding, a current will be induced in the secondary in the direction of the arrow 20. The circuit for this current is completed through the valve 19 but the current is prevented from flowing through the galvanometer by the valve 18. During a decrease in the current of the primary winding, current will be induced in the secondary in the direction opposite to the arrow 20 and this current will pass through the galvanometer $G_1$ because of the valves 18 and 19.

Since the test voltages used are impulses of only short duration, the readings of the ballistic galvanometer $G_1$ will be proportional to the total quantity of electricity traversing the secondary circuit of the transformer 16 during the decay of the current in the primary winding. This quantity will be proportional to the total change in the current in the primary during the period of decay, and since this change is from crest value to zero, the galvanometer reading will be proportional to the maximum crest value of the current in the primary winding.

There will, of course, be a slight time-lag between the crest value of the current and the crest value of the impressed voltage but the two will be proportional, assuming the voltage continues until the current reaches its crest value. Consequently, for practically all cases, the reading of the galvanometer $G_1$ will be proportional to the crest value of the impressed voltage. It is a comparatively simple matter to make corrections of the galvanometer reading to give crest voltages in cases where flashover occurs before the current reaches its maximum value. The galvanometer $G_1$ may, therefore, be used for determining one of the quantities desired in a time-lag curve, namely, the crest value of the impressed voltage.

The time-lag between the impression of voltage and flashover is determined from the readings of the galvanometer $G_2$ in conjunction with the readings of the galvanometer $G_1$. $G_2$ is connected to the potentiometer circuit at some point beyond the point 17 and measures the quantity of electricity that flows in this circuit from the time the voltage is impressed until flashover occurs or until the voltage has decayed to zero. Of course, when the test piece flashes over, the current is diverted to the arc over the test piece and ceases to flow in the potentiometer circuit. The quantity of electricity which passes through the galvanometer $G_2$ will, therefore, be a function of the impressed voltage and of the time elapsing before the test piece flashes over; that is, the time that the voltage is impressed upon the potentiometer circuit. The quantity of electricity will depend upon the shape of the impulse wave so that if the equation of the wave form is known and the crest value is known, the base of the geometrical figure representing the wave form may be computed and this base, of course, is the time elapsing before flashover. That is, from the equation of the impressed wave and its crest value which is determined by the reading of the galvanometer $G_1$, and from the reading of the galvanometer $G_2$ which is proportional to the area under the wave, the time lag may be computed.

In practical operation of the device, it is desirable to have a series of curves from which the time-lag may be directly read for the wave form employed and for any readings of the two galvanometers $G_1$ and $G_2$.

In determining the time lag curve of any particular test piece, it is only necessary to subject the test piece to a series of impulses of different crest values and of a known wave form and read the crest values from the galvanometer $G_1$ if it is calibrated to read these voltages directly and compute the time lag from the readings of the two galvanometers $G_1$ and $G_2$; or if a table or curve has previously been prepared, ascertain from this tabulation the time lag corresponding to the two galvanometer readings. The crest values thus obtained may be plotted as ordinates against the time-lag values as abscissas, thus giving the time-lag curve for the particular test piece.

An electrical valve 21 may be inserted in series with the galvanometer $G_2$ to prevent current from flowing in a reverse direction in the galvanometer $G_2$ during charging of the impulse generator. If the capacitance of the various parts of the potentiometer circuit is small, the valve 21 in some cases may not be necessary.

In the modification shown in Fig. 2, the potentiometer circuit is the same as in Fig. 1 but the transformer arrangement for measuring crest voltages is replaced by a condenser 22 connected to the point 17 through a valve 23; the other terminal of the condenser being grounded. The galvanometer $G_1$ may be connected to the condenser at will through a switch 24. In operation the condenser will receive a charge proportional to the crest voltage of the impressed wave because the quantity of the charge $Q=EC$ where E is the crest voltage and C is the capacitance of the condenser, but since C is constant, the quantity Q is proportional to the crest voltage E. After the impulse voltage has been impressed on the test piece, the charge Q is retained on the condenser 22 by the valve 23 and may be measured by closing the switch 24 to the galvanometer $G_1$ which will therefore give a reading proportional to the crest voltage. It is assumed, of course, that the switch 24 is closed quickly before there is appreciable loss due to leakage. The switch 24 may, if desired, be operated by a suitable relay controlled by the timing mechanism for the impulse generator.

I claim:

1. Electrical testing apparatus comprising an impulse generator, a potentiometer connected with said impulse generator for receiving and dividing the voltage impulse generated thereby, means for measuring the quantity of electricity passing through said potentiometer during the duration of an impulse impressed thereon, and means for measuring the crest value of said impulse voltage to provide data for the computation of the time of duration of said impulse.

2. Apparatus for determining the time lag of flashover characteristics of electrical apparatus comprising an impulse generator for impressing an impulse voltage of known wave form on said apparatus, a potentiometer connected in shunt with said apparatus for receiving said impulse voltage simultaneously with said apparatus, means for measuring the quantity of electricity passing through said potentiometer during the duration of said impulse, and means for measuring the crest voltage of said impulse to provide data for the computation of the time duration of said impulse.

3. Means for measuring the time lag flashover characteristics of electrical apparatus comprising means for impressing a high potential impulse on said apparatus, a potentiometer arranged in shunt with said apparatus, a transformer having its primary connected in shunt with a portion of said potentiometer, means for measuring the total quantity of electricity caused to flow in said potentiometer by an impulse impressed thereon, and means for measuring the quantity of electricity induced in the secondary of said transformer during the decay of current in said primary after an impulse has been impressed thereon.

4. Apparatus for testing an insulator comprising an impulse generator for impressing test voltage on said insulator, a potentiometer connected with said impulse generator in shunt with said insulator, a transformer having the primary winding thereof connected with said potentiometer to receive a current proportional to the current passing through said potentiometer, a ballistic galvanometer connected to the secondary winding of said transformer, and means for preventing the current induced in said secondary from passing through said galvanometer during increase in current in the primary winding and for directing through said galvanometer the current induced in said secondary during decay of current in said primary.

5. Testing apparatus for an insulator comprising an impulse generator for impressing a voltage impulse of known wave form on said insulator, a potentiometer connected with said impulse generator in shunt with said insulator, a transformer having its primary winding connected in series with a portion of said potentiometer, a ballistic galvanometer in circuit with the secondary of said transformer, electrical valves for directing through said galvanometer the current induced in said secondary during decay of current in said primary and for diverting from said galvanometer the current induced in said secondary during increase in current in said primary, and a second ballistic galvanometer connected in series with a portion of said potentiometer.

6. Electrical testing apparatus comprising an impulse generator for impressing an impulse voltage of known wave form upon an insulator, a potentiometer connected with said impulse generator in shunt with said insulator, means for segregating a quantity of electricity proportional to the crest voltage of said impulse, means for measuring said quantity to ascertain the crest voltage of said impulse, and means for measuring the total quantity of electricity passed through said potentiometer during the duration of said impulse to facilitate computation of the time of duration of said impulse.

7. The combination of an impulse generator adapted to generate impulse voltages of known wave form, a potentiometer connected with said generator for receiving the voltages generated thereby, means for connecting a test piece in shunt with said potentiometer, an air core transformer having its primary connected with said potentiometer for diverting a portion of the current therefrom, a ballistic galvanometer connected in circuit with the secondary of said transformer, an electrical valve in series with said galvanometer for preventing flow, through said galvanometer, of current induced in said secondary during increase in current in the primary of said transformer, a second electrical valve in shunt with said galvanometer and said first named valve for diverting said current, and a second ballistic galvanometer in circuit with a portion of said potentiometer for measuring the total quantity of electricity passing through said potentiometer during the duration of the impulse impressed on said test piece.

8. The method of ascertaining the time lag flashover characteristics of electrical apparatus comprising the steps of impressing an impulse voltage on said apparatus of known wave form, measuring the crest value of said voltage, measuring the total quantity of electricity passing through a circuit in shunt with said test piece during the duration of the impulse on said test piece and computing from the wave form of said impulse and the crest value of the voltage and the total quantity of electricity passing through said shunt, the time of duration of said impulse.

9. The method of determining the time lag flashover characteristics of electrical apparatus, comprising the steps of impressing a voltage impulse of known wave form on the apparatus and on a potentiometer in shunt therewith, passing a portion of the current in said potentiometer through one winding of a transformer, measuring the quantity of electricity induced in the other winding of said transformer during decay of current in said first-named winding to ascertain crest voltage of the impulse impressed on said apparatus, measuring the total quantity of electricity passed through said potentiometer, and ascertaining the time of duration of said impulse on said test piece from the quantities thus measured and the wave form of the impulse.

10. The method of ascertaining the time lag flashover characteristics of an insulator comprising the steps of impressing on said insulator and on a potentiometer in shunt with said insulator, an impulse voltage of known wave form, measuring the total quantity of electricity passing through said potentiometer during the duration of said impulse on said insulator, measuring the crest voltage of said impulse and ascertaining from the values thus made and from the wave form of said impulse the time of duration of said impulse.

11. The method of measuring the time lag characteristics of an insulator comprising the steps of impressing an impulse voltage of known wave form on said insulator and on a potentiometer in shunt with said insulator, measuring by means of a ballistic galvanometer the quantity of electricity passing through said potentiometer during the duration of said impulse on said insulator, passing a portion of the current in said potentiometer through an air core transformer, measuring by means of a ballistic galvanometer the quantity of electricity induced in the secondary of said transformer during decay of current in said potentiometer and ascertaining from the measured values and from the wave form of said impulse the time of duration of said impulse on said insulator.

12. Electrical testing apparatus comprising an impulse generator, a ballistic galvanometer, means for discharging through said galvanometer a quantity of electricity proportional to the crest voltage of an impulse generated by said generator to make possible the determination of crest voltages from the readings of said galvanometer, a second ballistic galvanometer, and means for discharging through said second galvanometer a quantity of electricity that is a function of the voltage of said impulse and of the time of duration of said impulse to make possible the determination of the time of duration of said impulse from the readings of the two galvanometers.

13. Electrical testing apparatus comprising an impulse generator, a potentiometer connected with said generator for receiving an impulse from said generator, a ballistic galvanometer connected with said potentiometer for measuring the quantity of electricity passed through said potentiometer by an impulse impressed thereon, and means for measuring the crest voltage of said impulse comprising a condenser connected through a valve in shunt with a portion of said potentiometer, a second ballistic galvanometer, and means for discharging said condenser through said second galvanometer.

WALTER S. JENNENS.